Figure 1:
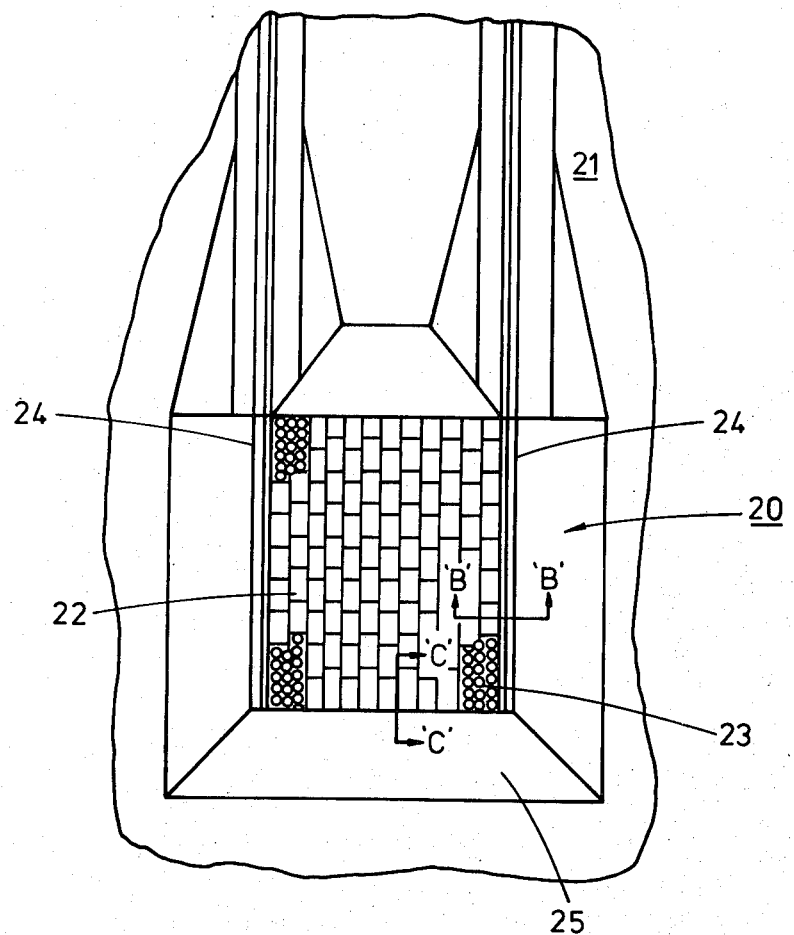

United States Patent [19]

Middleton

[11] 4,420,131
[45] Dec. 13, 1983

[54] MOORING DEVICES

[75] Inventor: Martin J. Middleton, Ilminster, England

[73] Assignee: Westland Aircraft Limited, Yeovil, England

[21] Appl. No.: 317,785

[22] Filed: Nov. 3, 1981

[30] Foreign Application Priority Data

Nov. 25, 1980 [GB] United Kingdom ............... 8037807

[51] Int. Cl.³ .......................... B64F 1/12; B64F 3/00
[52] U.S. Cl. ............................... 244/115; 244/114 R; 244/116; 244/110 E; 114/261
[58] Field of Search .................. 244/115, 116, 114 R, 244/110 E; 114/261; 248/499; 52/177, 386; 404/34; 410/90, 91, 52

[56] References Cited

U.S. PATENT DOCUMENTS 3,877,664  4/1975  Mesnet et al. ................... 244/115
4,222,695  9/1980  Sarides ............................. 410/91

Primary Examiner—Trygve M. Blix
Assistant Examiner—Ivy M. Shum
Attorney, Agent, or Firm—Larson and Taylor

[57] ABSTRACT

A mooring device for use, particularly in the mooring of an aircraft such as a helicopter on the deck of a ship includes a grid having an upper surface adapted for engagement by a harpoon carried by the aircraft. The grid comprises a plurality of substantially identical elements and retaining means secured to the deck and adapted to retain the elements in juxtaposed relationship. In one embodiment the elements are generally rectangular in plan and have an upper surface provided with both full and half apertures arranged so that when in said juxtaposed relationship, the elements combine to provide a generally continuous apertured upper surface.

12 Claims, 7 Drawing Figures

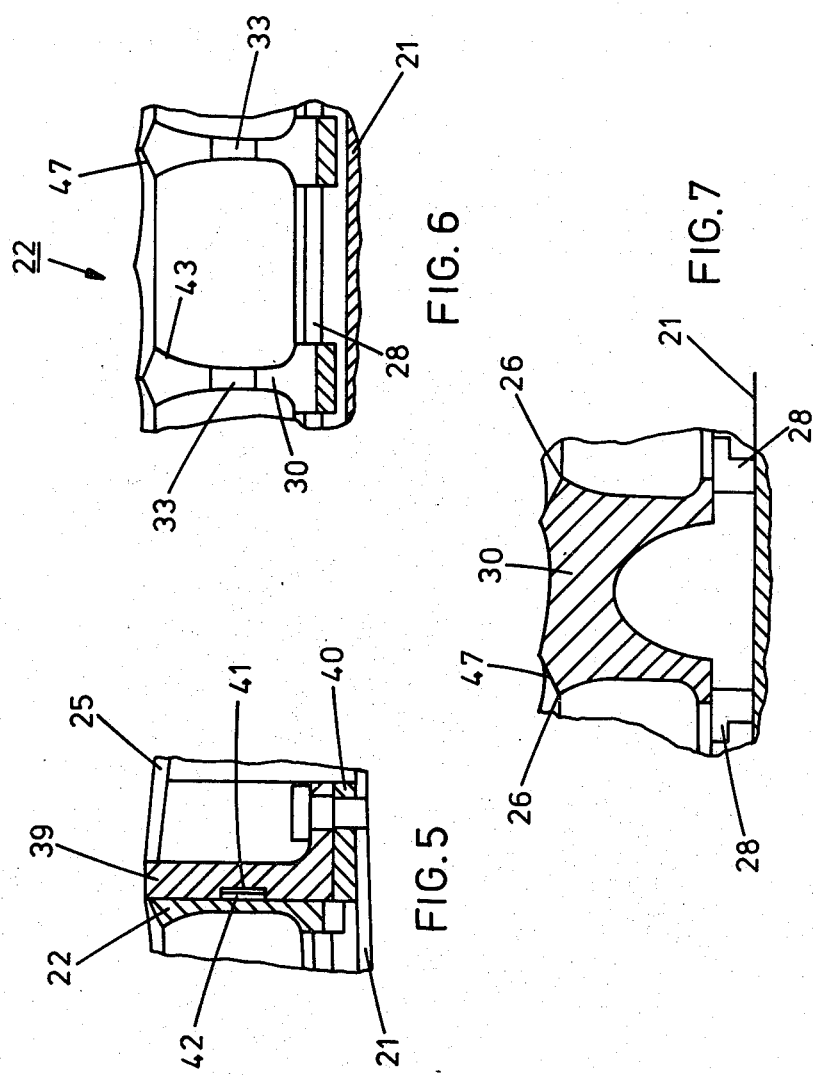

MOORING DEVICES

DESCRIPTION OF INVENTION

This invention relates to mooring devices, and is particularly concerned with such a device incorporating a grid for use in securing an aircraft such as a helicopter on the deck of a ship.

In operating a helicopter from the deck of a ship it is desirable to incorporate some means of securely attaching the helicopter to the deck after landing and prior to take-off since the motion of the deck would otherwise render such operations extremely hazardous. Many different types of mooring device have been proposed for this purpose, one of which comprises a grid structure secured to the deck for gripping by a harpoon carried by the helicopter.

In such a device the grid may comprise a circular apertured surface having an external diameter of about eight feet and which is manufactured by machining from a sheet of stainless steel. Such a grid is costly to manufacture and, in use, has necessitated modification of a ship's deck on which it is to be fitted, and a complex and expensive support means.

Accordingly, in one aspect, the invention provides a mooring device for attachment to a surface and comprising a grid having an upper surface adapted for engagement by a harpoon carried by an aircraft such as a helicopter, wherein said grid comprises a plurality of substantially identical elements and retaining means adapted to retain said elements in juxtaposed relationship on the surface.

Preferably, the elements are generally rectangular in plan-form shape, and are arranged in parallel rows.

A central region of the upper surface of each element may be formed with a plurality of apertures of a desired shape and an edge region of each element may be formed with a plurality of half apertures arranged so that when the elements are positioned in said juxtaposed relationship the half apertures of adjacent elements combine to form apertures corresponding to the shape of the central apertures.

The retaining means may comprise a plurality of parallel rails attached to a surface on which said grid is to be installed for engagement by downwardly depending leg portions formed on said elements. Conveniently, the rails are arranged in co-operating pairs and are shaped to define a slot of inverted T-shape in cross-section and located so that a centre of the slot is aligned with longitudinal edges of side-by-side located elements. In such an arrangement, the leg portions along each longitudinal edge of each element are provided with inwardly directed lip portions that co-operate in side-by-side arrangement to locate said elements in the T-shaped slots.

Preferably, the slots are open-ended whereby said elements may be slid into position along said rails, and said retaining means may include lateral closing beams secured to said surface and adapted to retain said plurality of elements.

Interlocking means may be provided on each element and may comprise a male lug located along one of the longitudinal and lateral sides of each element and complementary channels located along the other of the longitudinal and lateral sides whereby, when placed in juxtaposed relationship, the lugs of one element locate in the channels of an adjacent element.

In another aspect, the invention provides a mooring device on the deck of a ship, the device having an upper surface formed with a plurality of apertures for engagement by a harpoon carried by a helicopter, wherein said device comprises a plurality of substantially identical elements arranged in side-by-side parallel rows, retaining means including open-ended rails attached to the deck whereby said elements may be slid into position, and lateral closing beams attached to the deck and adapted to retain said rows of elements in position.

The retaining means may further include longitudinal closing beams attached to the deck. Conveniently, said longitudinal closing beams co-operate with parallel spaced-apart beams attached to the deck to define longitudinally extending parallel slotted rails along the side of the grid, said slots being continued across the deck surface for engagement by various aircraft handling apparatus.

In a further aspect, the invention provides a securing system for securing a helicopter to the deck of a ship and including a harpoon carried by the helicopter for selective engagement in a grid attached to the deck surface, wherein the grid comprises an apertured surface constructed of a plurality of identical elements and retaining means adapted to retain said elements in juxtaposed relationship.

Figure 2:
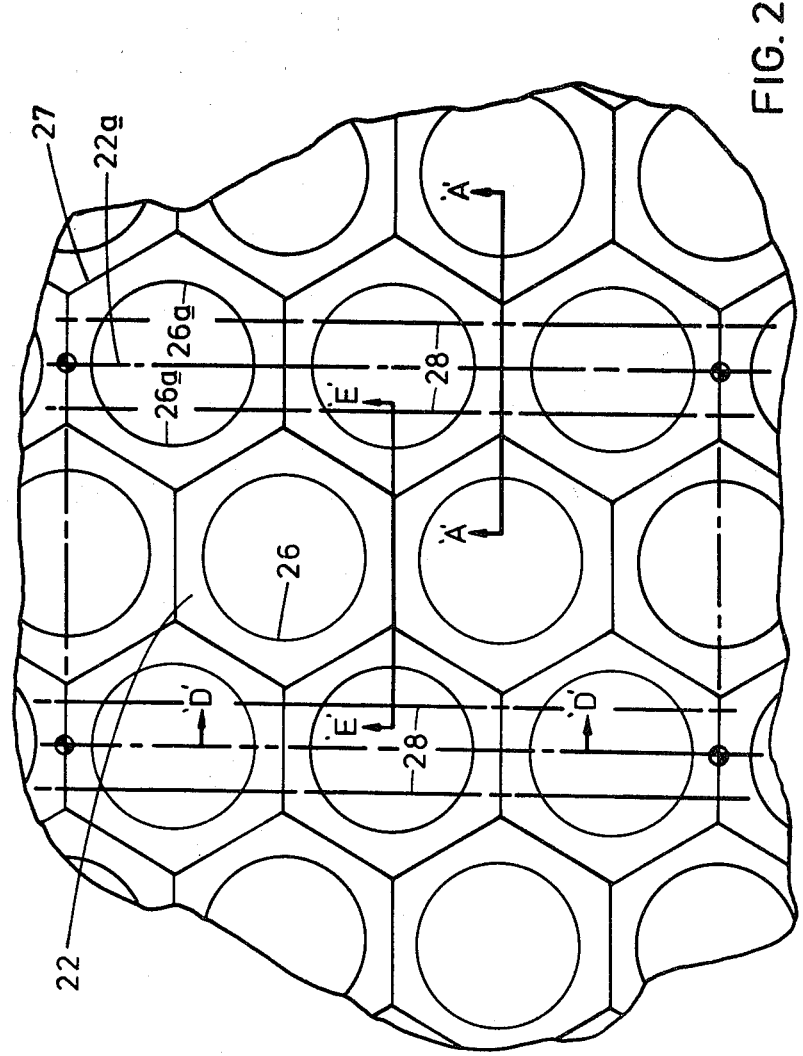
Figure 3:
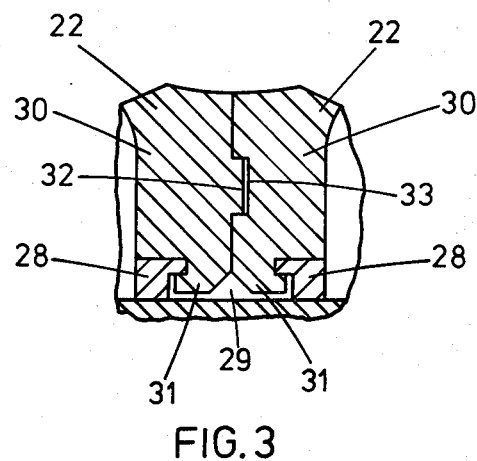
Figure 4:
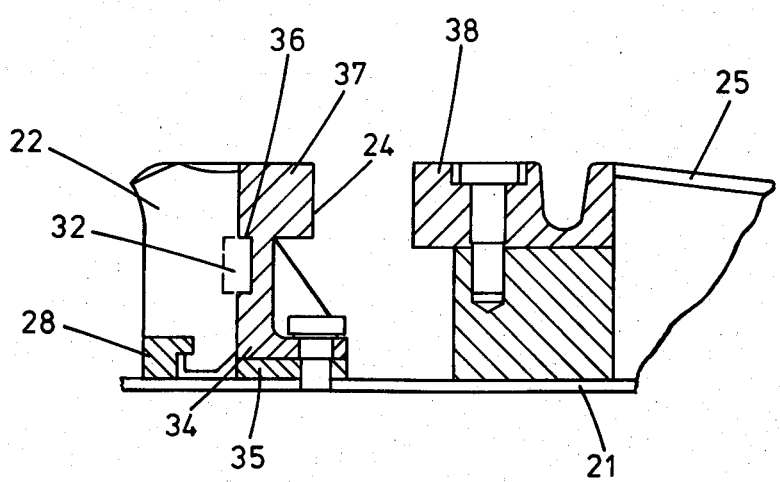

The invention will now be described by way of example only and with reference to the accompanying drawings, in which, FIG. 1 is a fragmentary plan view of a mooring device constructed in accordance with one embodiment of the invention and assembled on the deck of a ship, FIG. 2 is a plan view of a detail part of the device of FIG. 1 on an enlarged scale, FIG. 3 is a sectioned view taken on lines A—A of FIG. 2, FIG. 4 is a fragmentary sectioned view taken on lines B—B of FIG. 1, FIG. 5 is a fragmentary sectioned view taken on lines C—C of FIG. 1, FIG. 6 is a sectioned view taken on lines D—D of FIG. 2, and FIG. 7 is a sectioned view taken on lines E—E of FIG. 2.

Referring now to FIG. 1, a mooring device including a grid assembly 20 is shown installed on a deck surface 21 of a ship.

The grid assembly 20 comprises a plurality of identical elements 22 of generally rectangular outline plan-form shape. The elements 22 are arranged in juxtaposed relationship in parallel rows to provide a grid having an upper surface consisting of a plurality of adjacent apertures 23 for engagement by a harpoon member carried by an aircraft such as a helicopter (not shown). The grid assembly 20 itself has a rectangular plan-form shape, and parallel slotted tracks 24 extend along longitudinal edges thereof for engagement by other apparatus such as an aircraft deck handling trolley.

Inclined ramp surfaces 25 surround the grid assembly 20 to enable the grid to be traversed by a wheeled aircraft undercarriage.

FIG. 2 is a fragmentary plan of part of the grid assembly 20 on an enlarged scale, one of the elements 22 being delineated by broken outline 22a for explanatory purposes. Each of the elements 22 is rectangular in plan-form and is manufactured as an investment casting subsequently treated by bead blasting to improve surface finish and hardness.

Each of the elements 22 measures 300 mm×175 mm and is provided in a central region of its upper surface with two circular apertures 26 and, around its edges, with eight semi-circular apertures 26a. Thus, when located in juxtaposed relationship, the elements 22 provide a grid surface comprised of a plurality of identical circular apertures.

Adjacent rows of apertures 26 are offset and an upper surface around each aperture 26 is shaped so as to define generally hexagonal boundary lines 27 around each hole to provide a honeycomb effect.

Whilst this type of grid surface is preferred for the aforementioned application due to the fact that it provides the maximum hole volume for a particular grid area, it will be understood that the present invention is equally applicable to other grid configurations.

The elements 22 are retained on the deck surface by pairs of parrallel, longitudinally extending rails 28 which are equi-spaced laterally on either side of the longitudinal boundaries of element 22.

Referring now to FIG. 3, it will be seen that each of the rails 28 has an inwardly extending flange so that, as a pair, the rails 28 define parallel longitudinally extending slots 29 of inverted T-shape in cross-section. The elements 22 are provided with integral downwardly projecting leg portions 30 which, in the vicinity of the longitudinal boundaries, are machined to form an inwardly extending lipped portion 31 to engage, respectively, the flanged rails 28. Thus, as shown in FIG. 3, adjacent elements 22 are located in a common slot 29.

The slots 29 are open-ended so that respective elements 22 can be slid into position along the rails 28 when assembling the grid on the deck 21.

As also illustrated in FIG. 3, a vertical boundary surface of the legs 30 located along one of the longitudinal boundaries of the element 22 are provided with a male lug 32 and those along the opposite longitudinal boundary of an adjacent element 22 are provided with co-operating female channels 33. A similar lug 32 and channel 33 are provided respectively along the lateral boundaries of each element 22 thereby providing interlocking respective elements 22 when arranged in juxtaposed relationship.

Referring now to FIG. 4, the longitudinal boundaries of the grid 20 comprise retaining means in the form of a closing beam 34 bolted to a doubler 35 welded to the deck 21. A longitudinally extending channel 36 is provided along one face of the beam 34 for engagement by the male lugs 32 formed integral with the elements 22. Along the opposite longitudinal boundary, a similar beam 34 is used and a rectangular locking bar is inserted in the respective channels 36 in the beam 34 and channels 33 in the elements 22 to provide the interlocking.

The beams 34 have an outwardly extending lip portion 37 which co-operates with a similarly shaped parallel beam 38 to provide the previously mentioned slots 24 along the longitudinal edges of grid 20 and which are continued along the deck 21 for use by various deck handling apparatus. The longitudinal portions of ramp 25 are carried by the beam 38.

FIG. 5 illustrates the similar arrangement employed along the lateral boundaries of the grid 20, which comprises a closing beam 39 bolted to a doubler plate 40 welded to the deck 21 and supporting the lateral portions of the ramp 25. The beam 39 has a female channel 41 for engagement, along one lateral side, by male lugs 42 formed on the elements 22 and, along the other lateral side, by a rectangular locking bar (not shown) located in the opposed channels in the beam 39 and the elements 22.

FIGS. 6 and 7 illustrate detail features of the elements 22 with particular reference to the configuration of the circular apertures 26, and the shaped upper surface of the grid.

The apertures 26 have an internal radius 43 providing a part spherical surface for engagement in operation by an internally located harpoon member carried by a helicopter. This part spherical internal shape of the elements 22 of the illustrated embodiment is facilitated by this invention in which the grid is made up of a number of relatively small elements 22, and this configuration can advantageously be used with a harpoon having a lower end which expands automatically on entry into the apertures 22. Conveniently, the lower end of such a harpoon has a spherical periphery when expanded to co-operate with the internal spherical surface 43 of the elements 22 to provide adequate gripping and haul-down strengths, as well as an automatic pivoting of the mated parts to ensure correct engagement in the event that the harpoon is not in exact vertical alignment with one of the apertures. The sloping upper surface 47 around the apertures 26 serves to guide such a harpoon member into the aperture.

In an unillustrated embodiment, the internal shape of the apertures is modified for engagement by a harpoon adapted to grip around the bar-type sections formed between adjacent apertures 26. In such a modification it will be apparent that the "honeycomb" arrangement of the aperture with hexagonal boundaries, means that the harpoon can engage with any one of the six such bar portions around each aperture 26.

It will be noted from FIG. 1 that the elements 22 are arranged in parallel rows and that adjacent rows of elements 22 are offset longitudinally, and it is important to note that such a configuration can be achieved without requiring the manufacture of different size elements. Thus, the shorter element at the end of one row is achieved by cutting an element 22 across its width, the remaining portion of the cut element being assembled at the other end of the next row. Such a configuration may provide improved load spreading characteristics compared with a grid in which the lateral boundaries of the rows of elements 22 are aligned across the width of the grid 20.

In assembling a grid structure according to this invention, the guide rails 28 and one of the lateral doubling plates 40 are attached to the deck 21 for example by welding. If longitudinal retaining means are required, for example to form part of a trackway 24 as hereinbefore described, the doubling plates 35 are also welded to the deck 21. The closing beam 39 is then bolted to doubling plate 40.

The required number of elements 22 are then slid along the guide rails 28 to abut the beam 39, an appropriate number being cut as hereinbefore described if a staggered configuration is required. When all of the elements 22 have been correctly positioned, the second doubling plate 40 is attached to the deck 21 and the assembly is closed by fitment of the second lateral closing beam 39 and (where required) the rectangular locking bar.

The grid assembly 20 illustrated in FIG. 1 is made up of 108 identical elements 22, and has overall dimensions of 2.7 meters long and 2.1 meters wide.

Whilst several embodiments have been described and illustrated it will be understood that many modifications may be made without departing from the scope of the invention. For example, the actual shape of the apertures can be of any desired form to suit different harpoon configurations, and could be of square, rectangular or oval shape instead of the circular shape hereinbefore described. The grid assembly 20 is not limited to being mounted on a deck surface and could, for example, be located in a well so that an upper surface is flush with a surrounding deck surface. In such an installation, the walls of the well could be utilised as one or more of the retaining means previously described in relation to the illustrated embodiments. The size of the elements 22 is not limited to that hereinbefore described and, in practice, may be as large as the casting process allows.

What is claimed is:

1. A mooring device for attachment to a surface comprises a grid having an upper surface adapted for engagement by a harpoon carried by an aircraft such as a helicopter, wherein the grid comprises a plurality of substantially identical elements, said elements being rectangular in plan, disposed in parallel rows, and having a central region of the upper surface of each element formed with a plurality of apertures of a desired shape and an edge region of each element formed with a plurality of half apertures arranged so that when the elements are positioned in a juxtaposed relationship the half apertures of adjacent elements combine to form apertures corresponding to the shape of the central apertures, and retaining means adapted to retain said elements in juxtaposed relationship on the surface.

2. A device as claimed in claim 1, wherein the retaining means comprise a plurality of parallel rails attached to a surface on which the grid is to be installed, the rails being adapted for engagement by downwardly depending leg portions formed on said elements.

3. A device as claimed in claim 2, wherein the rails are arranged in co-operating pairs.

4. A device as claimed in claim 3, wherein the rails are shaped so that each co-operating pair define a slot of inverted T-shape in cross section.

5. A device as claimed in claim 4, wherein the centre of the slot is aligned with the longitudinal edges of the rows of elements.

6. A device as claimed in claim 5, wherein the leg portions along each longitudinal edge of the element are provided with inwardly directed lip portions that co-operate in side-by-side arrangement to locate said elements in said slots.

7. A device as claimed in claim 4, wherein the slots are open-ended and adapted so that the elements can be slid into position along the rails.

8. A device as claimed in claim 2, wherein the retaining means include lateral closing beams attached to a surface on which said grid is installed.

9. A device as claimed in claim 1, wherein interlocking means are provided on each element.

10. A device as claimed in claim 9, wherein the interlocking means comprise a male lug located along one of the longitudinal and lateral sides of each element and complementary channels located along the other of the longitudinal and lateral sides whereby when placed in juxtaposed relationship, the lugs of one element locate in the channels of adjacent elements.

11. A mooring device on the deck of a ship and having an upper surface formed with a plurality of apertures for engagement by a harpoon carried by a helicopter, wherein the mooring device comprises a plurality of substantially identical elements arranged in side-by-side parallel rows, retaining means including open-ended rails attached to the deck whereby said elements may be slid into position and lateral closing beams attached to the deck and adapted to retain said rows of elements in position.

12. A device as claimed in claim 11, wherein said retaining means includes longitudinal closing beams attached to the deck, said longitudinal closing beams co-operating with parallel spaced-apart beams to define longitudinally extending slotted rails along the side of the grid, said slots being extended across the deck for engagement by a helicopter handling apparatus.

* * * * *